(12) United States Patent
Benson et al.

(10) Patent No.: US 7,535,635 B2
(45) Date of Patent: May 19, 2009

(54) TRANSPARENT METER REGISTER COVER WITH INTEGRAL LIGHT PIPE

(75) Inventors: Ronald D. Benson, Colgate, WI (US); John A. Olson, Brookfield, WI (US)

(73) Assignee: Badger Meter, Inc., Milwaukee, WI (US)

( * ) Notice: Subject to any disclaimer, the term of this patent is extended or adjusted under 35 U.S.C. 154(b) by 154 days.

(21) Appl. No.: 11/789,640

(22) Filed: Apr. 25, 2007

(65) Prior Publication Data
US 2008/0266660 A1 Oct. 30, 2008

(51) Int. Cl.
*G02B 27/02* (2006.01)
(52) U.S. Cl. ............... 359/436; 359/440; 359/900; 73/431; 324/156
(58) Field of Classification Search .......... 359/440
See application file for complete search history.

(56) References Cited

U.S. PATENT DOCUMENTS

| 4,415,855 | A | * | 11/1983 | Dubauskas | 324/114 |
| 5,140,351 | A | | 8/1992 | Garcia et al. | |
| 5,861,742 | A | | 1/1999 | Miller et al. | |
| 6,737,855 | B2 | | 5/2004 | Huber et al. | |
| 2004/0085633 | A1 | * | 5/2004 | Rose | 359/440 |

OTHER PUBLICATIONS

Ion 8300, 8400, 8500 Intelligent Revenue Meters, Power Measurement, Oct. 31, 2001, pp. 1-8.
American National Standard for Electronic Time-of-Use Registers for Electricity Meters, The Institute of Electrical and Electronics Engineers, Inc., Oct. 24, 1991, pp. 7-17.

* cited by examiner

*Primary Examiner*—James Phan
(74) *Attorney, Agent, or Firm*—Boyle Fredrickson, S.C.

(57) ABSTRACT

The invention provides a method and a transparent housing cover for a meter index for communicating optical signals through an optical port formed on a front face of the transparent housing cover, for further communicating optical signals in a straight line past one side of the meter index; and for re-directing the optical signals at an angle of approximately ninety degrees to or from an optical transceiver. The cover includes an integrally formed light pipe, the light pipe further forming the optical port near the front of the body and the light pipe extending along one side of the body and behind the meter index; and the light pipe includes a surface at a back end for reflecting light at approximately ninety degrees to and from a light transceiver positioned behind the meter index.

15 Claims, 3 Drawing Sheets

TRANSPARENT METER REGISTER COVER WITH INTEGRAL LIGHT PIPE

TECHNICAL FIELD

This invention relates to utility meters, particularly meters having a register face with a numerical readout and an electronic portion installed behind the register face.

DESCRIPTION OF THE BACKGROUND ART

Miller et al., U.S. Pat. No. 5,861,742, issued Jan. 19, 1999, shows a cover for an electric meter with a plurality of integrally molded light pipes in the middle of the front cover for utilizing an optics probe, the purpose of which is not further described or illustrated.

Huber et al., U.S. Pat. No. 6,737,855, issued May 18, 2004, shows a meter register cover with a lens for focusing light through a light pipe.

Neither of these teachings address the problem of modern meters which are retrofitted with radio frequency modules for transmitting metering data.

The existing gas meter indexes have a transparent index housing cover that allows data to be transmitted through it. However, because the meter index takes up most of the surface area of the front of the index housing, data must be transmitted out of one side of the index housing. This is a problem, however, where multiple gas meters are installed side-by-side in apartment buildings. In that case a handheld device cannot be positioned on one side of the index housing where the signals would be communicated.

It is therefore desirable to provide a new solution for designing a meter register cover with a single integral light pipe to solve the problem of utilizing line-of-sight type wireless communications.

SUMMARY OF THE INVENTION

The invention provides a method and apparatus for directing an optical signal around an obstruction presented by a meter index.

The invention utilizes an integrally formed light pipe positioned to one side of the index or register face for conveying the signal past the index or register face and a reflective surface to bend an optical signal ninety degrees around a corner to reach an optical receiving device connected to an electronic circuit board which supports the electronic module in the unit.

The method and apparatus do not require any lens to focus light.

The invention overcomes a problem where multiple gas meters are installed side-by-side in apartment buildings.

Other objects and advantages of the invention, besides those discussed above, will be apparent to those of ordinary skill in the art from the description of the preferred embodiments which follows. In the description, reference is made to the accompanying drawings, which form a part hereof, and which illustrate examples of the invention.

DETAILED DESCRIPTION OF THE PREFERRED EMBODIMENTS

Figure 1:
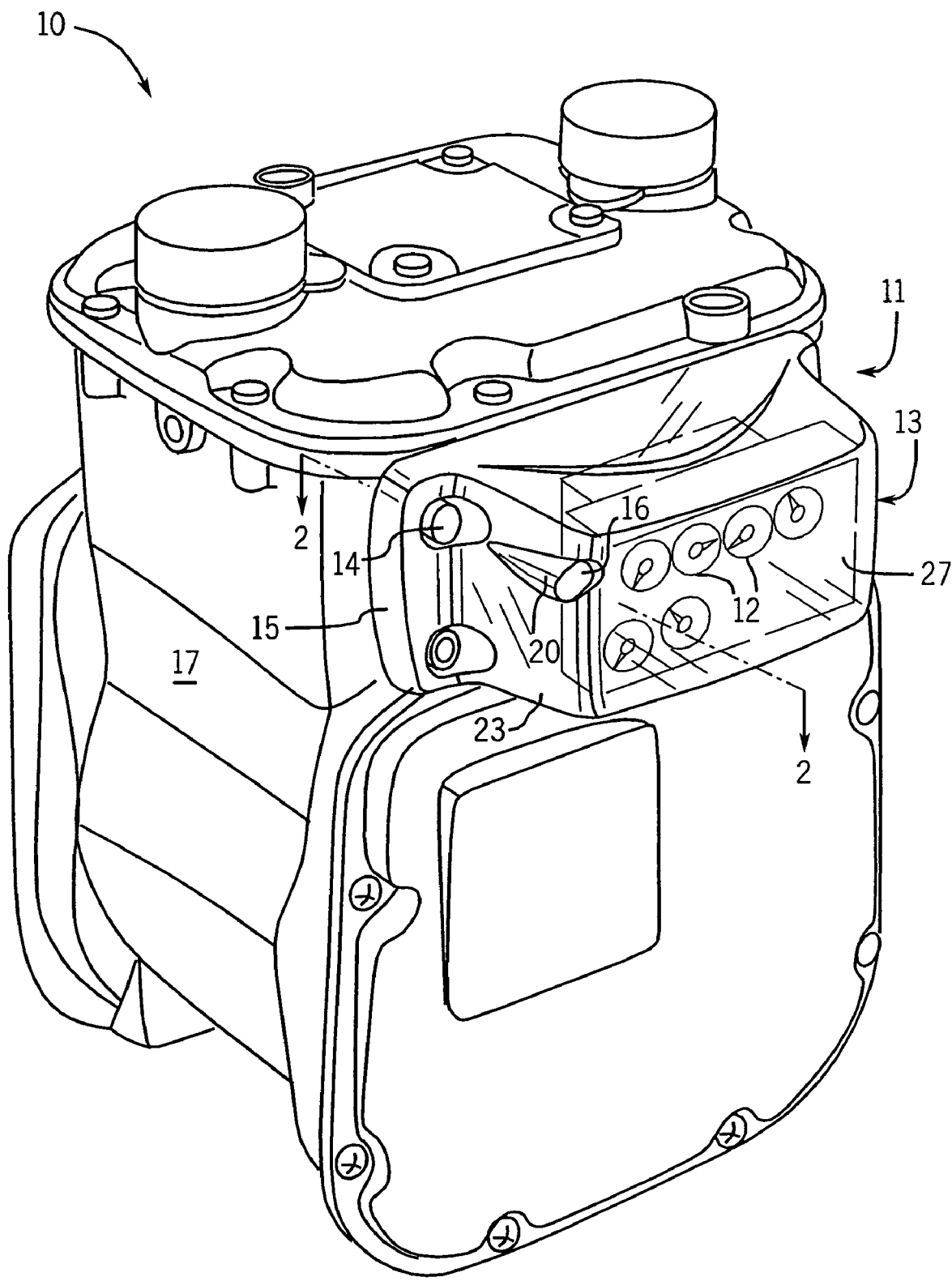
FIG. 1 is a perspective view of a gas meter with an index for reading a quantity of consumption.

Referring to FIG. 1, a gas meter 10 is shown with a traditional index readout device 11 including six dials 12. Such readout devices are sometimes referred to as meter registers because they register a number of units of gas or other utility consumption.

The index is covered by a transparent housing cover 13 that is molded using a polycarbonate resin to produce a clear, transparent material. The cover 13 is held in place by fasteners 14, which are inserted at the corners of a flange portion 15 of the cover 13. The housing cover 13 has an optical port 16 formed on a front face 27, for reasons to be explained below.

Figure 3:
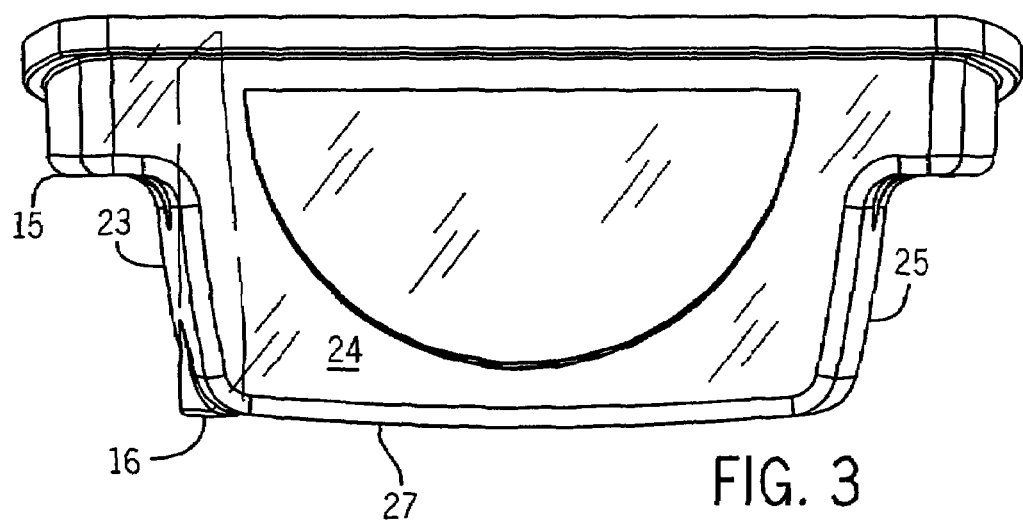
FIG. 3 is a top plan view of a housing cover for the index seen in FIG. 1.
Figure 4:
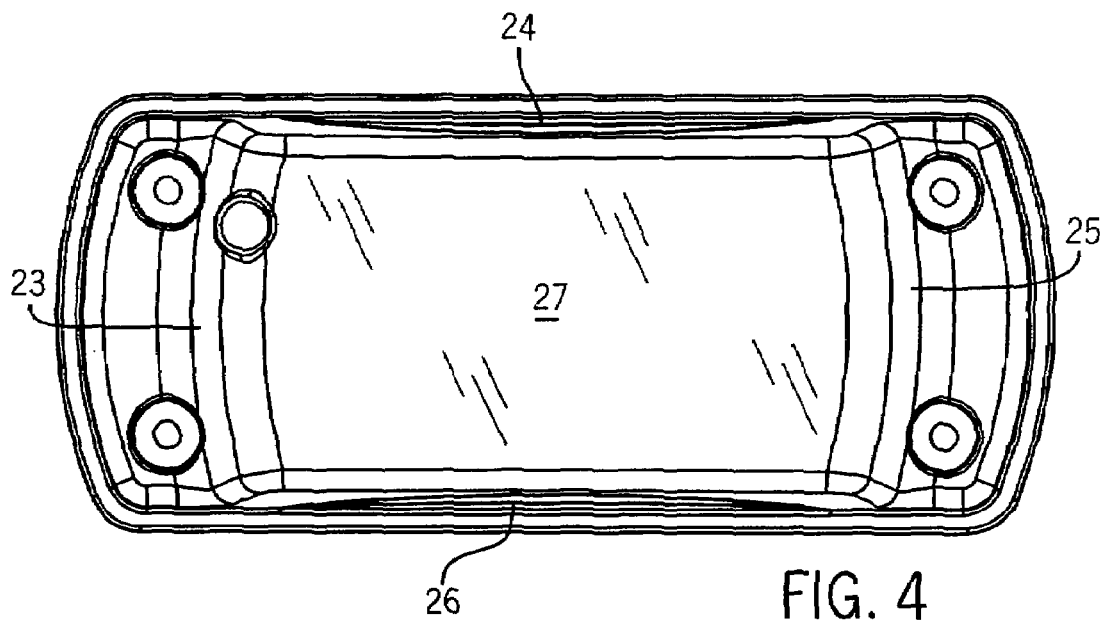
FIG. 4 is a front view in elevation of the housing cover of FIG. 3.
Figure 5:
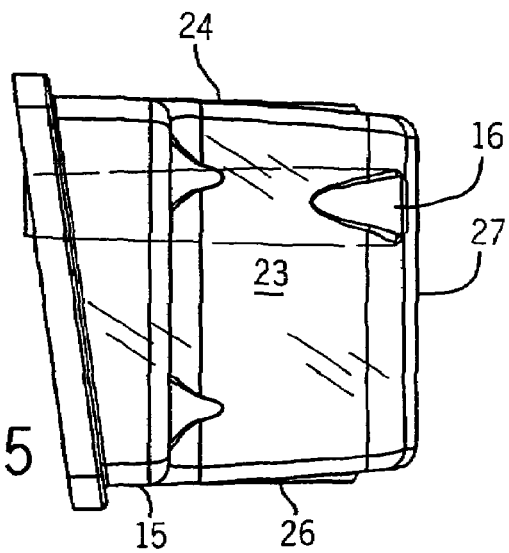
FIG. 5 is a left side view in elevation of the housing of FIGS. 3 and 4.

As seen in more detail in FIGS. 3 to 5, the cover 13 has a transparent body having a front face 27 and having side faces 23, 24, 25 and 26 extending backward from the front face 27 to a flange portion 15 for mounting to the gas meter housing 17.

Figure 2:
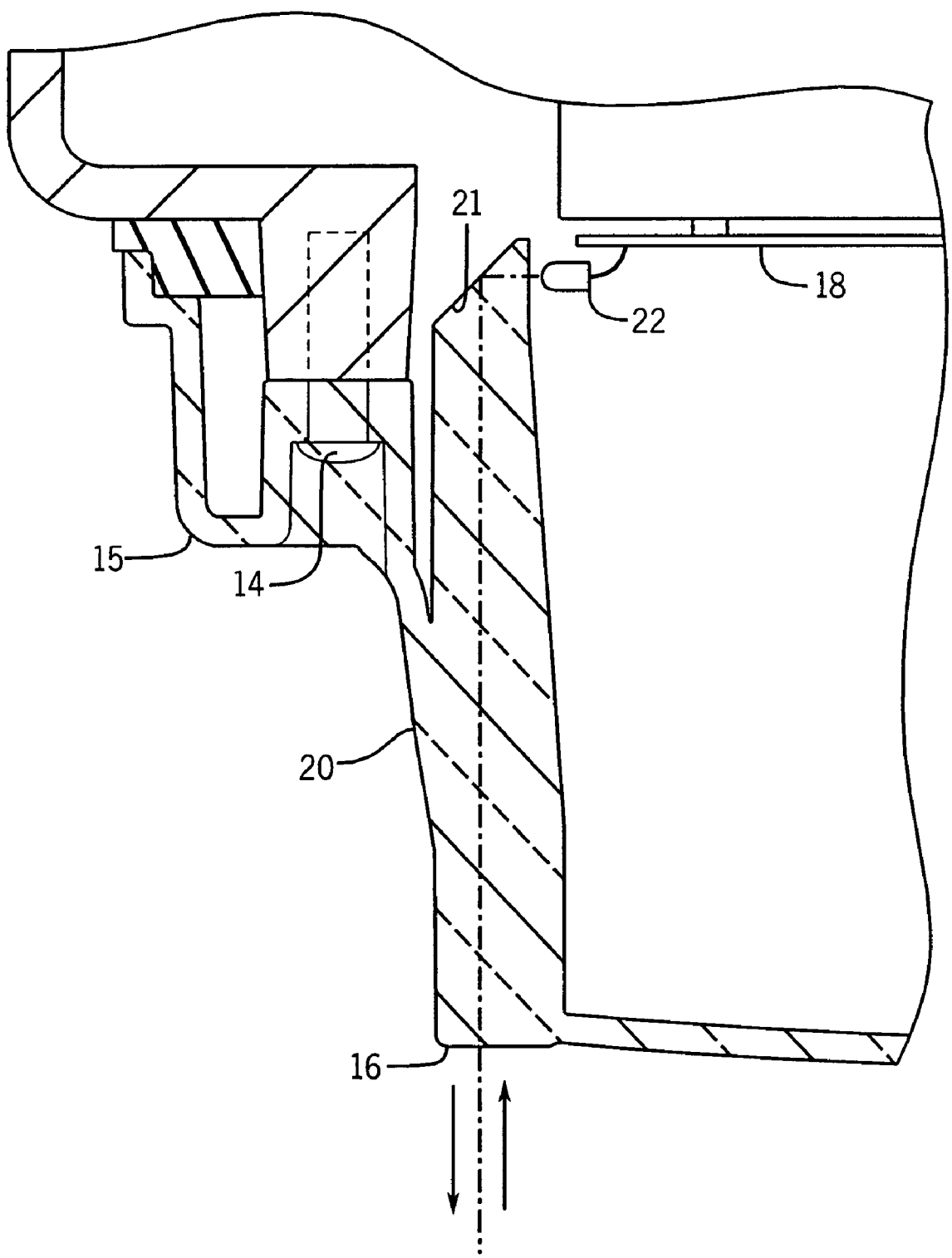
FIG. 2 is partial sectional view taken in a plane indicated by line 2-2 in FIG. 1.

In this embodiment, the gas meter register has been provided with a radio transmitter mounted on a circuit board 18 seen in FIG. 2, but not seen in FIG. 1. This transmitter is offered by the assignee of the present invention as the Orion® Integral Transmitter for Gas Meters.

The Orion® Integral Transmitter for Gas Meters is mounted on the gas meter 10 using a custom adapter plate that fits between the meter and existing index. The electronics and a battery are encapsulated to protect them from the moisture. The Orion® Integral Transmitter for Gas Meters encodes the gas accumulated meter reading, meter identification number, and tamper information and transmits radio frequency signals using bubble-up (broadcast) technology. The Orion® Integral Transmitter for Gas Meters signal can be received using the same variety of data collection devices also used by water utilities, and the signal can be collected by a receiver in a collection vehicle speeds up to fifty miles per hour.

During installation, the Orion® Integral Transmitter for Gas Meters is programmed with the current gas meter reading, so that account history is maintained, using a handheld programming unit carried by a technician. It may sometimes be necessary to provide other programming parameters or to obtain status data from such electronic units. Because the encapsulated transmitter module 18 is mounted behind the dial indicators 12, there is a problem in using the typical infrared port for wireless communication, because optical ports using infrared frequency communication require line-of-sight communication.

The memory in the electronic transmitter module is non-volatile such that it can only be altered with the programming unit, which communicates with the electronic transmitter module through the optical I/O port 16 along a left side surface 23 as viewed from the front of the housing cover 13.

The housing cover 13 is integrally molded in one piece with the light pipe 20, the light pipe 20 further forming the optical port 16 near the front of the cover 13 and the light pipe 20 extending along one side 23 of the cover 13 and behind the meter index 11. The light pipe 20 includes a surface 21 at a back end for reflecting light at approximately ninety degrees to and from a light transceiver 22 positioned behind the meter index 11.

The optical port 16 conveys light signals in an infrared frequency range in a straight line to the reflective surface 21.

The light signals are conveyed in both directions between the reflective surface 21 and the optical port 16.

In the method of the present invention optical signals are communicated through the optical port 16 formed on one edge of a front face 27 of transparent cover 13 for the meter index; and are further communicated in a straight line past the meter index 12. From there, the optical signals are re-directed at an angle of approximately ninety degrees to or from an optical transceiver 22 electrically connected to the circuit board 18.

Although the method and apparatus have been described in relation to a gas meter 10, the invention may be applied to other types of utility meters, including meters for electric and water utilities.

And although the light pipe 20 has been described as being located on the left side of the cover 13 as seen from the front, it is located on right side 25 in another embodiment and could also be located on the top 24 or bottom 26 of the cover 13.

This has been a description of the preferred embodiments, but it will be apparent to those of ordinary skill in the art that variations may be made in the details of these specific embodiments without departing from the scope and spirit of the present invention, and that such variations are intended to be encompassed by the following claims.

We claim:

1. A housing cover for a meter index, comprising:
   a transparent body having a front surface and having side surfaces extending backward from the front surface for mounting to a base of the meter index;
   wherein the transparent body includes an integrally formed light pipe, the light pipe further forming an optical port near the front surface of the body and the light pipe extending along one side of the body and behind the meter index; and
   wherein the light pipe includes a surface at a back end for reflecting light at approximately ninety degrees to and from a light transceiver positioned behind the meter index.

2. The housing cover of claim 1, wherein the optical port conveys light signals in an infrared frequency range in a straight line to the reflective surface.

3. The housing cover of claim 2, wherein the light signals are conveyed in both directions between the reflective surface and the optical port.

4. The housing cover of claim 2, wherein the light signals are encoded with data related to utility metering.

5. The housing cover of claim 1, wherein the side surfaces including a top surface, a bottom surface, a right side surface and a left side surface, and wherein the light pipe extends along the left side surface as viewed from the front of the housing cover.

6. The housing cover of claim 1, wherein the housing cover is made of a polycarbonate resin that produces a transparent material.

7. The housing cover of claim 1, wherein the housing cover is integrally molded in one piece with the light pipe.

8. The housing cover of claim 1, wherein the housing cover is for a meter index on a gas meter.

9. The housing cover of claim 1, wherein the housing cover is for viewing a utility meter register.

10. A method for communicating optical signals past a meter index, the method comprising:
    communicating optical signals through an optical port formed on a front face of a transparent housing cover for the meter index;
    further communicating optical signals in a straight line past the meter index; and
    re-directing the optical signals at an angle of approximately ninety degrees to or from an optical transceiver.

11. The method of claim 10, wherein the optical signals are conveyed in an infrared frequency range in a straight line between the optical port and a point of re-direction at an angle of approximately ninety degrees.

12. The method of claim 11, wherein the optical signals are conveyed in both directions between the reflective surface and the optical port.

13. The method of claim 11, wherein the optical signals are encoded with data related to utility metering.

14. The method of claim 10, wherein the optical signals are conveyed through housing cover for a meter index on a gas meter.

15. The method of claim 10, wherein the optical signals are conveyed through a housing cover for a utility meter register.

* * * * *